(12) United States Patent
Rivas Saiz et al.

(10) Patent No.: US 6,424,546 B2
(45) Date of Patent: Jul. 23, 2002

(54) TRANSFORMATION CIRCUIT FOR UNIVERSAL SWITCHED POWER CONVERTER

(75) Inventors: Mercedes Rivas Saiz; Antonio Julian Huertas Blazquez; Jose Andres Navas Sabater; Jaime de la Peña Llerandi, all of Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/903,541

(22) Filed: Jul. 13, 2001

(30) Foreign Application Priority Data

Jul. 14, 2000 (ES) .......................................... 200001760

(51) Int. Cl.$^7$ ............................................. H02M 3/335
(52) U.S. Cl. .............................. 363/26; 363/95; 363/134
(58) Field of Search ................................ 363/20, 21.01, 363/21.02, 21.03, 21.04, 21.12, 24, 25, 26, 134, 95, 97

(56) References Cited

U.S. PATENT DOCUMENTS

| | | | | |
|---|---|---|---|---|
| 3,900,786 A | * | 8/1975 | Jordan | 363/24 |
| 4,890,214 A | * | 12/1989 | Yamamoto | 363/49 |
| 4,947,312 A | * | 8/1990 | Tsuruoka et al. | 363/134 |
| 5,459,650 A | * | 10/1995 | Noro | 363/24 |
| 6,009,001 A | * | 12/1999 | Otake | 363/23 |

* cited by examiner

*Primary Examiner*—Adolf Deneke Berhane
(74) *Attorney, Agent, or Firm*—Sughrue Mion, PLLC

(57) ABSTRACT

Universal switched power converter having a transformer that comprises a first winding (11-3) divided into two parts and having an intermediate tap (11-3-1), and a second winding (11-9) connected in cascade with rectifier means (12) and filter means (13), so that a first current flows through the part of said first winding (11-3) comprised between the end of the primary winding (11-3) connected to a first input terminal (11-1) and the intermediate tap (11-3-1) and through a second switching element (11-6) connected to the intermediate tap (11-3-1) and to a second input terminal (11-2), when the input voltage applied across the input terminals (11-1, 11-2) is close to a first predetermined voltage value and the second switching element (11-6) is in a conducting state.

9 Claims, 1 Drawing Sheet

TRANSFORMATION CIRCUIT FOR UNIVERSAL SWITCHED POWER CONVERTER

OBJECT OF THE INVENTION

The present invention relates to a universal switched power converter that is capable of receiving a broad range of voltage levels, of both high direct current (DC) voltage coming from a source of rectified alternating current (AC) voltage and low direct current (DC) voltage coming from a battery that supplies backup power, and transforms the voltage received to another voltage level regulated and adequate for being supplied to at least one load.

Thus, the universal switched power converter is highly versatile, has a high overall efficiency and both its operation and its control are straightforward.

STATE OF THE ART

A switched power converter for being connected indistinctly to an alternating current (AC) power line or to a direct current (DC) voltage source, and converting the received voltage to a voltage adequate for a load, is known from the U.S. Pat. No. 5,414,610, being included in the present application by reference.

According to the power converter proposed in this document, it comprises a first pair of input terminals for receiving a voltage from an AC mains and a second pair of input terminals for receiving a voltage from a DC voltage source, converting the received voltage into a voltage level adequate for a load.

Each one of the foregoing pairs of input terminals are respectively connected to a primary circuit including a switching device; control means drive the switching of the two switching devices in order to store energy in at least one primary winding of a transformer during the conducting period of both switching devices, which are switched simultaneously, that is, their conducting and non-conducting periods coincide; and said energy is released into a secondary winding of the transformer in order to supply the voltage level to the load, during the non-conducting period of said switching devices.

The power converter proposed by the U.S. Pat. No. 5,414,610 makes an inefficient use of the transformer due to the operating mode of the switching devices.

Therefore, the overall efficiency of the power converter is low, and signifies a drawback for applications in which there is a requirement for devices of reduced size and high performance.

Consequently, there is a need to develop a switched power converter comprising a reduced number of switching elements and having high overall efficiency.

CHARACTERISATION OF THE INVENTION

The universal switched power converter of the present invention carries out the conversion of a broad range of input voltages, from a voltage source, to an output voltage desired for one or more loads. Said conversion is performed with a high overall efficiency since it has a forward topology.

The universal switched power converter has a transformer that comprises a first winding divided into two parts having, consequently, an intermediate tap, and a second winding, which is connected in cascade with rectifying means and with filter means.

According to the voltage level received from the power source, the voltage is applied through a part of the first winding or through the complete first winding. Thus, when the input voltage is close to a first predetermined voltage value and a second switching element is in a conducting state, a first current flows through the part of the first winding comprised between the end of the first winding connected to a first input terminal and the intermediate tap and through the second switching element connected to the intermediate tap and to a second input terminal.

When the input voltage applied across the input terminals is close to a second predetermined voltage value and the first switching element is in a conducting state, a third current flows through the two parts of the first winding comprised between the end of the primary winding connected to the first input terminal and the end of the first winding connected to a first switchable element connected, in turn, in series with a first switching element connected to the second input terminal.

It is to be pointed out that the second predetermined voltage value is greater that the first predetermined voltage value. In brief, depending on the voltage level received from the power source, the voltage is applied to a common part of the first winding or to the complete first winding.

BRIEF DESCRIPTION OF THE DRAWINGS

A more detailed explanation of the invention is given in the following description, based on the figures attached, in which.

DESCRIPTION OF THE INVENTION

Figure 1:
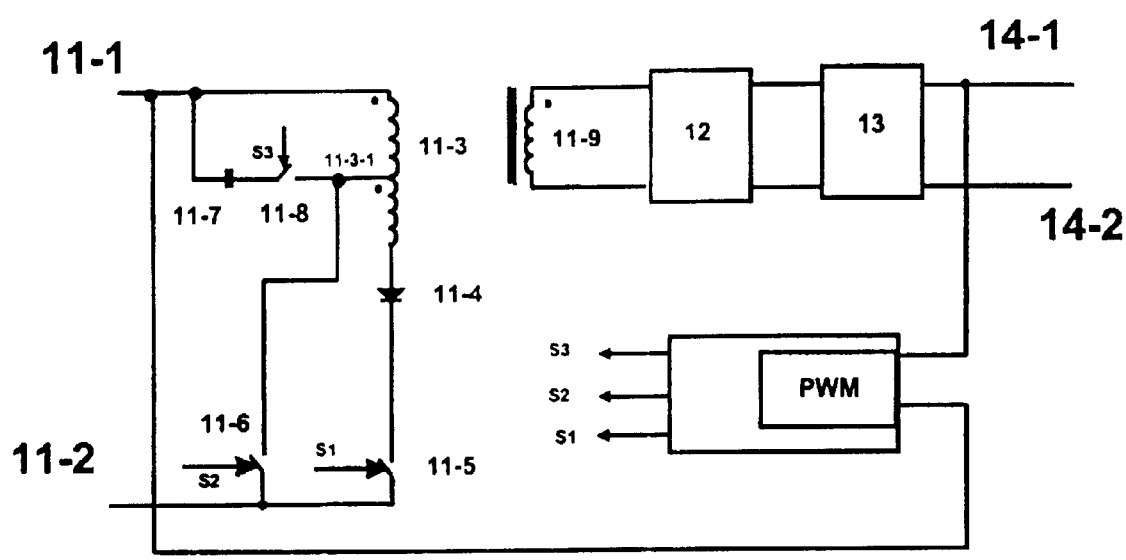
FIG. 1 shows in a schematic form, an embodiment of a universal switched power converter according to the invention.

FIG. 1 is a detailed electrical schematic of a circuit corresponding to a first embodiment of the universal switched power converter.

Said switched converter carries out the transformation of a voltage received from a voltage source over a first input terminal 11-1 and a second input terminal 11-2 to an output voltage adequate for being supplied to one or more loads connected to output terminals 14-1 and 14-2.

The voltage source can be an AC source or a DC source that supplies a voltage. In the event that the power source is AC, the power converter receives a rectified sinusoidal voltage from a rectifier bridge that is connected to the AC source. The second input terminal 11-2 represents the common reference voltage level of the universal switched power converter.

The universal switched power converter has a transformer that provides isolation between the input and the output of the switched converter.

The transformer has a first winding 11-3 divided into two parts, consequently it has a shunt or intermediate tap 11-3-1. The number of turns included in each part need not be the same, that is, one part of the first winding 11-3 can have a greater number of turns than the other part thereof.

The first input terminal 11-1 is connected to one end of the first winding 11-3 and the other end is connected to a first terminal of a first switchable element 11-4.

A second terminal of the first switchable element 11-4 is connected to a first terminal of a first switching element 11-5; likewise, a second terminal of the same switching element 11-5 is connected to the second input terminal 11-2.

The intermediate tap 11-3-1 of the first winding 11-3 is connected to a first terminal of a second switching element 11-6; likewise, a second terminal of the same switching element 11-6 is connected to the second input terminal 11-2.

A first terminal of a third switching element 11-8 is connected to the intermediate tap 11-3-1, a second terminal of said third switching element 11-8 is connected to one end of a first capacitor 11-7 and its other end is connected to the first input terminal 11-1 of the switched converter.

In a further embodiment of the switched power converter, the intermediate tap 11-3-1 can be connected to one end of the first capacitor 11-7 and its other end is connected to the first terminal of the third switching element 11-8, its second terminal being connected to the input terminal 11-1 of the switched converter.

Returning now to the first embodiment, see FIG. 1, the secondary side of the switched converter is formed by the connection in cascade of a second winding 11-9 of the transformer, rectifying means 12 and filtering means 13.

For example, the rectifier 12 is a self-driven synchronous rectifier formed by two rectifying branches, a first branch being that which really performs the rectification and a second branch that is the free flow branch; and the filtering means 13 is a LC filter that has a first inductor and a second capacitor.

The duty cycles of the first switching element 11-5, of the second switching element 11-6 and of the third switching element 11-8 are controlled, for example, by means of a control stage that has a pulse width modulator PWM. The control stage receives a signal representative of the voltage level applied across the input terminals 11-1, 11-2 and, similarly, it receives a signal representative of the voltage level applied across the output terminals 14-1, 14-2, producing at a first output a first control signal S1, which is applied to a control terminal of the first switching element 11-5.

Also, it produces, at a second output, a second control signal S2, which is applied to a control terminal of the second switching element 11-6, and produces at a third output a third control signal S3, which is applied to a control terminal of the third switching element 11-8.

The first switching element 11-5, the second switching element 11-6 and the third switching element 11-8 can be, respectively, field effect transistors, MOSFET.

Below an explanation of the operation of the universal switched power converter is given. For example, when the input voltage is close to a second predetermined voltage level, the input voltage is applied over the complete primary winding 11-3 comprised between the two ends thereof, a voltage being induced in the secondary winding 11-9.

The second predetermined voltage level is greater than a first predetermined voltage level supplied from the power source. In brief, the first voltage level represents the minimum value that the input voltage can take, and the second voltage level represents the maximum value that the input voltage can take.

Then, the first switching element 11-5 is switched by means of the first control signal S1; that is, it passes in a successive manner through a conducting state and a non-conducting state. The second switching element 11-6 is not switched; that is, it is permanently in a non-conducting or off state.

During each conducting period of the first switching element 11-5, the energy flows into the rectifier 12 and at its output a voltage is produced that is smoothed by the filter 13, the regulated output voltage being obtained across the output terminals 14-1 and 14-2, which corresponds to the output of the universal switched power converter. As a consequence, the universal switched power converter has a forward topology when the first switching element 11-5 is switched.

In turn, during the conducting state of the first switching element 11-5, certain energy is stored in the self-inductance of the transformer by way of current.

A conducting period of the first switching element 11-5 is followed by a non-conducting period, in which the voltage across the secondary winding 11-9 is reversed blocking the branch of the rectifier 12 that really performs the rectification. The current continues to flow towards the load that compels the free flow branch of the rectifier 12 to conduct.

The voltage on the first inductor of the filter 13 is now reversed in such a manner that the current in the first inductor decreases, which implies the discharging of the current of the first inductor, continuing to deliver current to the load.

In this non-conducting period, the magnetising energy stored in the transformer core shall be released through the third switching element 11-8 and the first capacitor 11-7; when the third switching element 11-8 is in a conducting state a discharge path is provided through which flows a fourth current that demagnetises the transformer. Said current flows through the windings comprised between the end of the first winding 11-3 connected to the first input terminal 11-1 and the intermediate tap 11-3-1 thereof.

This energy is withdrawn from the transformer, since, otherwise, it would be stored in the transformer and progressively would increase and would lead unavoidably to the destruction of said transformer.

The demagnetising process, that is returning the transformer core to the initial state, is developed during each non-conducting period of the first switching element 11-5.

When the values of the input voltage are close to a first predetermined voltage level, the first switching element 11-5 remains off or non-conducting, and the second switching element 11-6 is switched by means of the second control signal S2, in such a manner that it passes successively through a conducting period and a non-conducting period.

In like manner, during a conducting period of the second switching element 11-6, the input voltage present across the input terminals 11-1 and 11-2 is applied to the turns comprised between the end of the first winding 11-3 connected to the first output terminal 11-1 and the intermediate tap 11-3-1 thereof; a voltage being induced on the second winding 11-9.

In this manner, the energy flows through the rectifier 12, at the output of which is produced a voltage that is smoothed by the filter 13, the output voltage being obtained across the output terminals 14-1 and 14-2. As a consequence, when the second switching element 11-6 is switched, the universal switched power converter also has a forward topology.

Likewise, during this conducting period of the second switching element 11-6, certain energy is stored in the self-inductance of the transformer by way of current.

The first switchable element 11-4 prevents the first switching element 11-5 from conducting when the second switching element 11-6 is switched.

A conducting period of the second switching element 11-6 is followed by a non-conducting period, in which the voltage on the secondary winding 11-9 is reversed blocking the branch of the rectifier 12 that really performs the rectification. The current continues to flow towards the load that compels the free flow branch of the rectifier 12 to conduct.

The voltage on the first inductor of the filter 13 is now reversed in such a manner that the current in the first inductor decreases, which implies the discharging of the current of the first inductor, continuing to deliver current to the load.

In this non-conducting period, the magnetising energy stored in the transformer core is released, similarly, through the third switching element 11-8 and the first capacitor 11-7; when the third switching element 11-8 is in a conducting state a discharge path is provided through which a second current flows which demagnetises the transformer.

The demagnetising process is developed during each non-conducting period of the second switching element 11-6.

It is to be pointed out that both the second demagnetising current and the fourth demagnetising current flow through the turns of the first winding 11-3 of the transformer comprised between the end of the first winding 11-3 connected to the first output terminal 11-1 and the intermediate tap 11-3-1 thereof.

An output voltage loopback via the control stage adapts the duty cycle of the first switching element 11-5 and of the second switching element 11-6, respectively, in order to regulate the voltage level across the output terminals 14-1, 14-2. Likewise, it controls the duty cycle of the third switching element 11-8 in order to demagnetise the transformer during the non-conducting period of the switching element connected to the input terminal 11-1, preventing the saturation of its core.

As a result, the first switching element 11-5 is not switched when the second switching element 11-6 is switched, and vice versa. It is to be pointed out that the third switching element 11-8 is switched in both cases.

Then, the universal switched power converter has a high overall performance, is densely integrated (compact in size), and its cost is low in comparison with conventional two-stage converters, due to the fact that the universal switched power converter always has a forward topology, independently of the voltage level that it receives from the power source. All the foregoing improves to a great extent the efficiency of the converter and provides it with great operational flexibility by being able to work with a broad range of input voltage levels.

What is claimed is:

1. A universal switched power converter including a transformer that comprises:
   a first winding divided into at least two parts, said first winding having at least one intermediate tap; and
   a second winding coupled in cascade with a rectifying means and a filter means;
   wherein the universal switched power converter is adapted to turn on and off a second switching element so that a first current flows through a part of said first winding between the end of said first winding coupled to a first input terminal and said intermediate tap, and through the second switching element coupled between said intermediate tap and a second input terminal, when the input voltage applied across said input terminals is closed to a first predetermined voltage value, and a first switching element is permanently in a non-conducting state.

2. The universal switched power converter according to claim 1, wherein the switched converter is adapted to turn on and off a third switching element such that a second current flows through the part of said first winding coupled between the end of said primary winding coupled to said first input terminal and said intermediate tap, and through a series combination of the third switching element and a first capacitor, said series combination being coupled in parallel with the part of first winding comprised between the end of said primary winding connected to the first input terminal and the intermediate tap, when the second switching element is turned off.

3. The universal switched power converter according to claim 2, wherein the switched converter is adapted to turn on and off the first switching element such that a third current flows through the overall first winding between the end of said primary winding coupled to said first input terminal and the end of said first winding coupled to the first switching element that is coupled in series with a first switchable element and is coupled to said second input terminal, when the input voltage applied across said input terminals is closed to a second predetermined voltage value that is greater than said first predetermined voltage value, while the second switching element is permanently in a non-conducting state.

4. The universal switched power converter according to claim 3, wherein the switched converter is adapted to turn on and off a third switching element such that a fourth current flows through the part of said first winding between the end of said primary winding coupled to said first input terminal and said intermediate tap and through the series combination of the third switching element and the first capacitor, coupled in parallel with the part of first winding between the end of said primary winding coupled to the first input terminal and the intermediate tap, when the first switching element is turned off.

5. The universal switched power converter according to claim 1, wherein the switched converter is adapted to turn on and off the first switching element such that a third current flows through the overall first winding between the end of said primary winding coupled to said first input terminal and the end of said first winding coupled to the first switching element that is coupled in series with a first switching element and is coupled to said second input terminal, when the input voltage applied across said input terminals is closed to a second predetermined voltage value that is greater than said first predetermined voltage value, while the second switching element is permanently in a non-conducting state.

6. The universal switched power converter according to claim 5, wherein the switched converter is adapted to turn on and off a third switching element such that a fourth current flows through the part of said first winding between the end of said primary winding coupled to said first input terminal and said intermediate tap and through the series combination of the third switching element and the first capacitor, coupled in parallel with the part of first winding between the end of said primary winding coupled to the first input terminal and the intermediate tap, when the first switching element is turned off.

7. The universal switched power converter according to the claim 1, further comprising:
   a control stage adapted to drive the duty cycles of the first switching element and of the second switching element, such that when the first switching element is being switched on and off, the second switching element off, and vice versa.

8. The universal switched power converter according to claim 7, wherein the control stage is adapted to drive the duty cycles of the third switching element such that when any of the switching elements is turned off and the other switching element is permanently in a non-conducting state, the third switching element is turned on.

9. The universal switched power converter according to claim 8, wherein the control stage comprises a pulse width modulator (PWM).

* * * * *